United States Patent [19]

Cane et al.

[11] Patent Number: 4,466,934
[45] Date of Patent: Aug. 21, 1984

[54] HOT SPRUE VALVE ASSEMBLY FOR AN INJECTION MOLDING MACHINE

[75] Inventors: Albert Cane, Torrance; Mitchell P. Brown, San Pedro, both of Calif.

[73] Assignee: Discovision Associates, Costa Mesa, Calif.

[21] Appl. No.: 296,730

[22] Filed: Aug. 27, 1981

Related U.S. Application Data

[62] Division of Ser. No. 202,824, Oct. 31, 1980.

[51] Int. Cl.$^3$ ............................................. B29D 17/00
[52] U.S. Cl. ................... 264/106; 264/155; 264/161; 264/163; 264/328.9; 425/810
[58] Field of Search ............... 264/106, 107, 155, 161, 264/163, 328.9; 425/554, 556, 562, 566, 568, 571, 574, 810

[56] References Cited

U.S. PATENT DOCUMENTS

| | | |
|---|---|---|
| 2,698,464 | 1/1955 | Wilson . |
| 3,937,779 | 2/1976 | Simmons ............................ 264/106 |
| 4,085,178 | 4/1978 | McNeely ........................ 264/155 X |
| 4,185,955 | 1/1980 | Holmes ........................ 264/106 X |
| 4,260,360 | 4/1981 | Holmes ........................... 425/810 X |

FOREIGN PATENT DOCUMENTS

| | | |
|---|---|---|
| 18210 | 10/1980 | European Pat. Off. . |
| 871956 | 5/1942 | France . |
| 2014057 | 4/1970 | France . |
| 2039980 | 1/1971 | France . |
| 51-56865 | 5/1976 | Japan .............................. 264/328.9 |
| 453671 | 6/1968 | Switzerland . |

*Primary Examiner*—Thomas P. Pavelko

[57] ABSTRACT

A hot sprue valve assembly is provided for controlling flow of molten material through a hot sprue bushing of an injection molding machine. The valve assembly is particularly designed for use with an injection molding machine for molding centrally apertured record discs, such as video information discs, and the valve assembly includes means for forming the central aperture in the disc. In one embodiment, the aperture-forming means comprises a sleeve valve for molding the aperture in the disc prior to solidification of the disc-forming melt, whereas in another embodiment the aperture-forming means comprises a punch for punching the aperture subsequent to solidification of the disc-forming melt.

2 Claims, 10 Drawing Figures

HOT SPRUE VALVE ASSEMBLY FOR AN INJECTION MOLDING MACHINE

This is a division of application Ser. No. 202,824, filed Oct. 31, 1980.

BACKGROUND OF THE INVENTION

This invention relates generally to injection molding machines and, more particularly, to injection molding machines including means for selectively opening and closing the hot sprue of a machine molding assembly designed for molding centrally apertured record discs, such as video information discs.

An example of an injection molding machine of this particular type is disclosed in copending and commonly assigned patent applications U.S. Ser. No. 847,367, filed in the name of J. R. Holmes et al., and entitled "METHOD AND MEANS FOR REPLICATING CENTRALLY APERTURED VIDEO DISC RECORDS", and U.S. Ser. No. 031,205, filed in the name of J. R. Holmes, and entitled "MOLDING APPARATUS FOR PRODUCING CENTRALLY APERTURED RECORD DISCS". The apparatus described in these applications comprises an injection molding machine having a molding assembly with first and second mold halves reciprocally movable between a closed position, wherein molten plastic material is injected into an annular mold cavity to form a video information disc, and an open position wherein the mold parting line is opened and the resultant molded video information disc is removed from the machine. The annular mold cavity is defined by a pair of planar, disc-shaped stamping dies secured to platens which are in turn reciprocally movable toward and away from each other along with the respective mold halves.

In injection molding machines of this general type, it is well known to inject molten plastic material under pressure through an injection sprue bushing and into the mold cavity defined by the two disc-shaped stamping dies. When the mold cavity is filled with the molten plastic material, the surrounding machine structure including the respective mold halves and the sprue bushing are cooled by a circulating liquid coolant to reduce the temperature of the molten plastic material and thereby solidify the material. In this manner, the molded record disc is quickly solidified within the mold cavity whereupon the solidified disc can be removed from the machine and the cycle restarted, thereby allowing a rapid production rate of the record discs. However, the plastic material within the sprue bushing is relatively thick compared with the plastic material within the mold cavity, whereby the plastic material within the sprue bushing takes the longest time to solidify. The cycle time for molding the record discs is therefore dependent upon the cooling time of the sprue material, and not upon the cooling time of the disc per se. Moreover, this solidified sprue material must be removed from the molded record disc, as by means of a punch assembly or the like, to yield the desired thin, substantially planar record disc including the desired central aperture.

The present invention provides an injection molding machine including an improved mold assembly particularly designed for use in making relatively thin, substantially planar record discs, such as video information discs, wherein the disc production rate is substantially independent of the solidification time of molten plastic material in the sprue bushing region of the injection machine. The present invention fulfills this need by providing a valve assembly for isolating the molten plastic material within the sprue bushing from the mold cavity during solidification of the plastic material.

SUMMARY OF THE INVENTION

The present invention is embodied in an improved injection molding machine for use in producing centrally apertured record discs, such as video information discs. The machine includes a mold assembly having first and second mold halves reciprocally movable with respect to each other between a closed position wherein molten plastic material is injected into an annular disc-shaped mold cavity to form a molded record disc, and an open position wherein the mold parting line is opened and the molded record disc can be extracted from the machine. At least one surface of the annular mold cavity is defined by a planar, disc-shaped stamping die carried by one of the two molds halves for use in imparting appropriate information to the surface of the molded disc.

According to the invention, the molding assembly for the machine machine includes a hot sprue bushing through which molten plastic material is maintained at an elevated temperature and is injected into the mold cavity. This hot sprue bushing defines a flow path positioned generally at a right angle to the plane of the mold cavity and aligned axially with the central axis of the mold cavity. The molten plastic is thus injected into the mold cavity along an axis coincident with the central aperture to be formed in the molded record disc.

A hot sprue valve assembly is mounted on the machine generally in axial alignement with the hot sprue bushing and on the side of the mold cavity opposite the hot sprue bushing. The hot sprue valve assembly includes a valve member movable toward the hot sprue bushing when the mold cavity is filled with molten plastic material for cooperation therewith to close off flow of molten plastic material into the mold cavity. This valve member remains in this closed position during solidification of the plastic material in the mold cavity to isolate the hot sprue region of the mold assembly from the mold cavity. Thus, a cooling fluid can be circulated in heat exchange relation with the material within the mold cavity to speed solidification of the plastic material therein without waiting for the plastic material within the sprue region to solidifiy. Since the material within the mold cavity is relatively thin, solidification occurs at a rapid rate resulting in a substantial decrease in the cycle time for a given record disc, and a corresponding substantial increase in the overall record disc production rate of the machine.

In one embodiment of the invention, the hot sprue valve assembly comprises a cylindrical sleeve valve which is advanced into and through the mold cavity, and into bearing engagement with the hot sprue bushing to prevent further flow of plastic material into the mold cavity. Simultaneously, the sleeve valve molds a central aperture in the record disc prior to solidification of the plastic material. After the plastic material within the mold cavity has solidified, the mold parting line is opened and the sleeve valve is retracted whereupon an ejector pin positioned for movement along the axis of the sleeve valve is advanced to eject from the machine the relatively small partially-solidified plastic wafer in the aperture region of the disc.

In another embodiment of the invention, an ejector valve pin is positioned generally in axial alignment with the sprue bushing on the side of the mold cavity opposite the sprue bushing. When the mold cavity is filled with molten plastic material, the ejector valve pin is advanced to a first position to valve off and close the sprue bushing to further flow of plastic material into the mold cavity. After solidification of the plastic material within the mold cavity, the sprue bushing is moved axially away from the mold cavity and a punch carried about the ejector valve pin is advanced through the mold cavity to punch the central aperture in the disc. The mold parting line is then opened whereupon the ejector valve pin is advanced further to dislodge the relatively small wafer of at least partially solidified plastic material from the punch, whereupon the punch and the ejector pin are retracted to their initial positions for the next cycle and the solidified disc is removed from the machine.

Other features and advantages of the present invention will become apparent from the following detailed description, taken in conjunction with the accompanying drawings which illustrate, by way example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
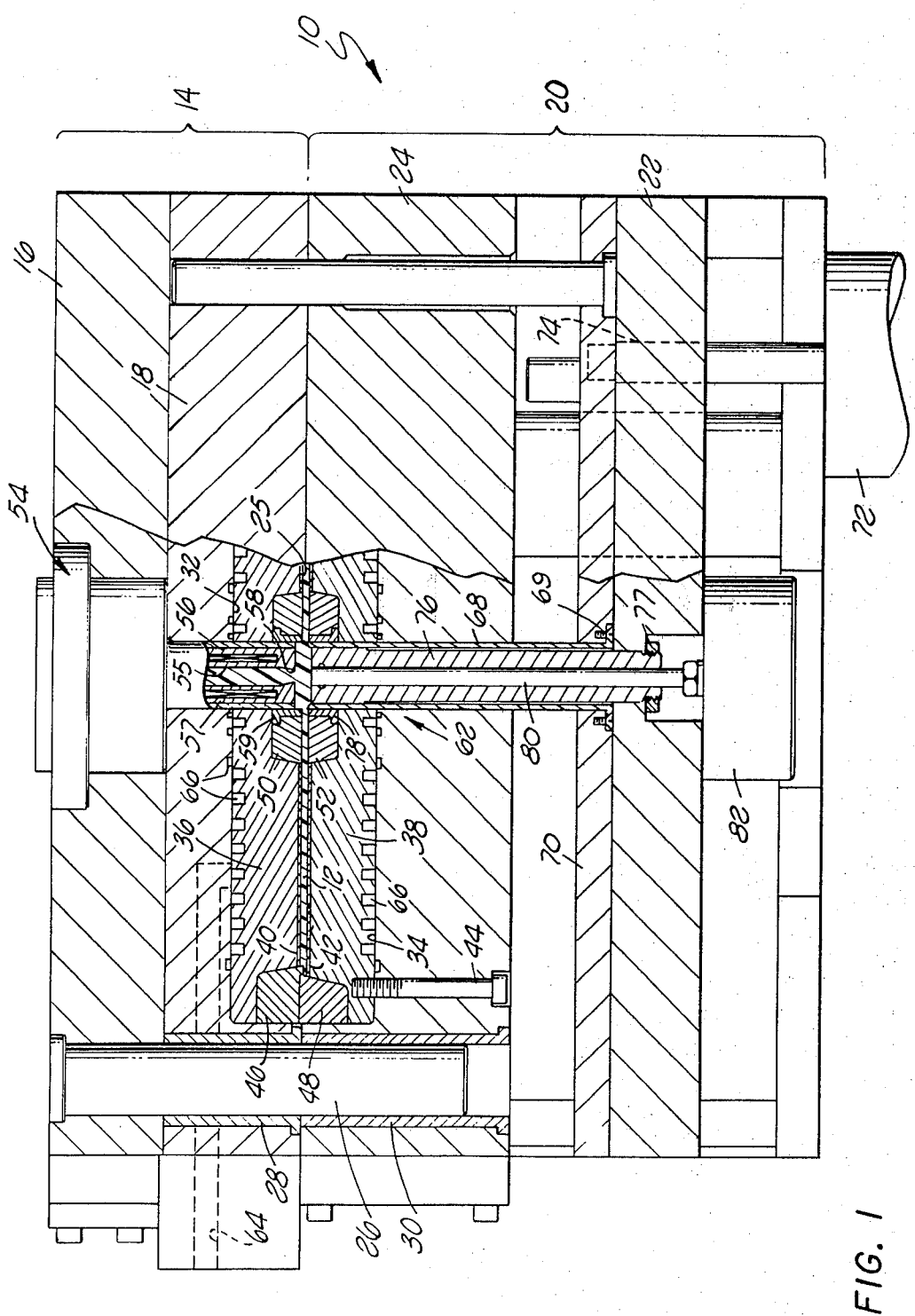
FIG. 1 is a simplified cross sectional view of an injection molding machine including a hot sprue valve assembly embodying the present invention.

Referring now to the drawings, and particularly to FIG. 1 there is shown a molding apparatus 10 for use in combination with an injection molding machine (not shown) to produce a centrally apertured record disc 12, such as a video information disc. One suitable molding machine in which the molding apparatus 10 can be used comprises a 375 ton model manufactured by the Stokes Division of Pennwalt Manufacturing Co.

Figure 4:
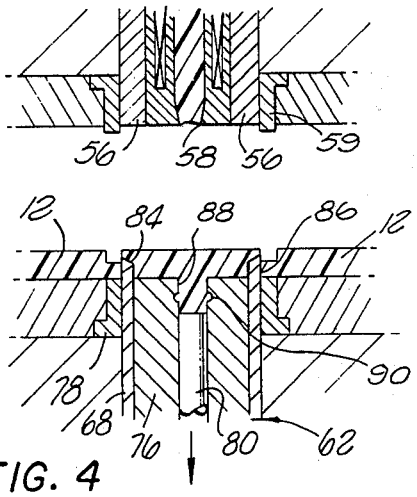
FIG. 4 is an enlarged fragmented cross sectional view illustrating a subsequent position of movement of the valve assembly.

The molding apparatus 10 comprises a first mold half 14 including a base plate 16 and a carrier plate 18, and a second mold half 20 including a base plate 22 and a carrier plate 24. The first and second mold halves 14 and 20 along with their associated base and carrier plates 16, 18 and 22, 24 are reciprocally movable toward and away from each other to open and close a relatively thin, substantially planar mold cavity 25 in which the record disc 12 is molded. More specifically, the mold halves 14 and 20 are movable between a closed position with their carrier plates 18 and 24 in abutting relation with each other as shown in FIG. 1, and an open position separated from each other as illustrated in FIG. 4. A plurality of guide pins 26, one of which is shown in FIG. 1, are received slidably within bushings 28 and 30, respectively, mounted on the two carrier plates 18 and 24 for maintaining the two mold halves 14 and 20 in close axial alignment with each other.

The carrier plates 18 and 24 of the two mold halves 14 and 20 respectively include annular plate-shaped recesses 32 and 34 facing toward each other generally in axial alignment for receiving annular platens 36 and 38, respectively. As illustrated, these platens 36 and 38 can be secured in position within the recesses 32 and 34 as by means of bolts 44, or the like. The platens 36 and 38 respectively carry disc-shaped stamping dies 40 and 42 which have a surface configuration representative of the information to be cast into the record disc 12 and cooperate with each other when the mold halves 14 and 20 are in the closed position to define the disc-shaped mold cavity 25 in which the disc 12 is injection molded. Annular rings 46 and 48 can be provided about the circumference of the mold cavity 25, and annular clamps 50 and 52 can be provided near the central axis of the mold cavity 25 for securing the stamping dies 40 and 42 in fixed positions upon their respective platens 36 and 38, all in a well-known manner. The specific construction and operation of these various components is discussed in further detail in copending and commonly assigned U.S. application Ser. No. 031,205, filed Apr. 18, 1979, by John R. Holmes and entitled "APPARATUS FOR PRODUCING CENTRALLY APERTURED RECORD DISCS", the disclosure of which is incorporated herein by reference.

An injector assembly 54 is carried by the base plate 16 of the first mold half 14, and this injector assembly 54 operates to supply a disc-forming melt to the mold cavity 25. More specifically, the injector assembly 54 comprises an injector gun assembly for heating plastic material to a molten state and for injecting an appropriate quantity of the molten plastic material to the mold cavity 25. This molten plastic material is injected into the mold cavity through a flow path 55 defined by a generally cylindrical sprue bushing 56 including a nozzle 58 opening into the mold cavity 25. As illustrated, this flow path 55 is oriented generally at a right angle to the plane of the mold cavity 25, and generally in alignment with the central axis of the mold cavity.

The injector assembly 54 includes a cylindrical sleeve 57 extending downwardly, as illustrated in FIG. 1, through the carrier plate 18 and the platen 36 of the first mold half 14. This sleeve 57 concentrically contains the sprue bushing 56 in the desired positional alignment with the mold cavity 25. The sleeve 57 is in turn received within a cylindrical die bushing 59 captured by the central clamp 50 for constraining the sleeve 57 and the sprue bushing 56 in alignment with respect to the platen 36 and the associated stamping die 40.

The sprue bushing 56 carries a suitable heating device, such as the annular heating coil 60 illustrated in the drawings. Thus, the sprue bushing 56 and the coil 60 maintain the temperature level of the molten plastic material within the bushing flow path 55 at a desired elevated temperature as the material is injected into the mold cavity 25. In operation of the machine, the injected molten plastic material fills the mold cavity 25 and conforms to the shape of said cavity, whereby the plastic material also conforms to the specific geometry of the two stamping dies 40 and 42. When one or both of the stamping dies 40 and 42 is formed to include appropriate surface discontinuities representative of appropriate information, such as video and/or audio information, the stamping dies 40 and 42 correspondingly impart this information to the plastic material within the mold cavity 25 as that material solidifies to form the molded record disc 12.

The invention of this application comprises a hot sprue valve assembly 62 designed to valve off flow of molten plastic material through the sprue bushing 56 when the mold cavity 25 is filled with the molten plastic material. In this manner, the molten plastic material within the flow path 55 of the hot sprue bushing 56 is isolated from the mold cavity 25 whereby the plastic material within the mold cavity 25 can be solidified rapidly and substantially independently of the plastic material in the region of the sprue bushing 56. More specifically, a cooling fluid such as water can be circulated in heat exchange relation with the mold cavity 25 via an inlet 64 and through a plurality of coolant fluid flow passages 66 defined by the carrier plates 18 and 24 and their respective platens 36 and 38. This circulating coolant fluid reduces the temperature level of the plastic material within the mold cavity 25 and thereby solidifies that material rapidly to form the molded record disc 12. Of course, this coolant fluid is circulated from these passages 66 via an outlet (not shown) to an appropriate heat exchanger or the like for reduction of coolant fluid temperature and recirculation to the mold assembly 10 through the inlet 64.

The hot sprue valve assembly 62 of this invention offers significant advantages over the prior art in that it is not necessary to wait for the molten plastic material within the region of the sprue bushing 56 to solidify before the record disc 12 can be removed from the mold cavity 25. Alternately stated, it is necessary only to solidify the plastic material having a relatively small thickness within the mold cavity 44 before the solidified disc 12 can be removed from the machine and a subsequent molding cycle initiated. This significantly decreases the cycle time for producing a single record disc 12, and thereby substantially increases the overall disc production rate of the injection molding machine.

Figure 2:
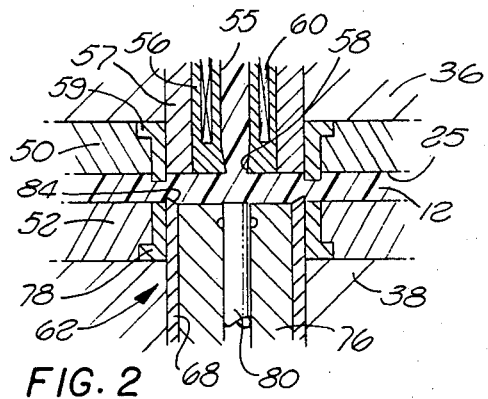
FIG. 2 is an enlarged fragmented cross sectional view illustrating the hot sprue valve assembly in an open position.
Figure 3:
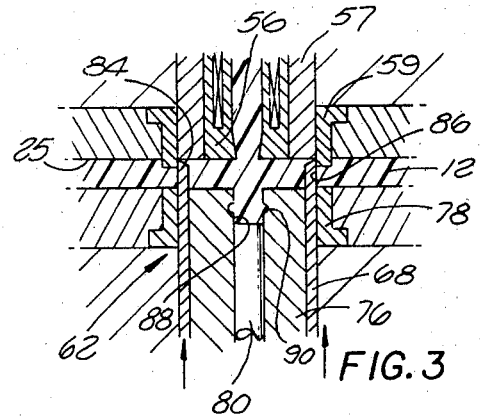
FIG. 3 is an enlarged fragmented cross sectional view illustrating the valve assembly in a closed position.

The hot sprue valve assembly 62 is illustrated in detail in FIGS. 2-5. As illustrated, the valve assembly 62 comprises an elongated cylindrical sleeve valve 68 positioned on the side of the mold cavity 25 opposite the sprue bushing 56, and aligned generally on an axis common with the axis of the sprue bushing 56. The sleeve valve 62 is connected at one end as by screws 69 to a reciprocal plate 70 for movement toward and away from the sprue bushing 56 in response to operation of an air cylinder 72 coupled to the plate 70 via a piston rod 74. Importantly, the sleeve valve 68 is sized for engagement with the sprue bushing 56, and is movable between a "back" position spaced from the sprue bushing 56 as illustrated in FIG. 2, and a "forward" position in sealing engagement with the sprue bushing 56 as illustrated in FIG. 3.

The sleeve valve 68 projects slidably through matingly sized openings in the carrier plate 24 and the associated platen 38 of the second mold half 20. A stationary cylindrical valve guide 76 is secured to the base plate 22 as by a nut 77, and is concentrically received within the sleeve valve 68 for guiding the sliding movement of the sleeve valve 68. Moreover, a cylindrical die bushing 78 retained in position by the adjacent central clamp 52 functions to accurately guide movement of the sleeve valve 68.

The hot sprue valve assembly 62 also includes an ejector pin 80 carried slidably within the stationary valve guide 76 for movement along the central axis of the valve guide 76 and the sleeve valve 68. This ejector pin has its rear end secured in a suitable manner to an air cylinder 82 which operates to reciprocate the ejector pin 80 toward and away from the sprue bushing 56 independently of the sleeve valve 68. That is, the air cylinder 82 operates to move the ejector pin 80 between a "back" position retracted away from the sprue bushing 56, and a "forward" position wherein the ejector pin 80 is advanced toward the sprue bushing 56 to a position generally coinciding with the forward end of the valve guide 76.

Molten plastic material is injected under pressure by the injector assembly 54 through the sprue bushing 56 and its nozzle 58 into the mold cavity 25 whereupon the material spreads annularly to fill the mold cavity 25. When the mold cavity 25 is filled with the molten plastic material, the sleeve valve 68 is advanced to its "forward" position for annular cooperation and engagement with the lowermost face of the sprue bushing 56, as shown in FIG. 3. This cooperation between the sleeve valve 68 and the sprue bushing 56 effectively isolates the portion of the molten plastic material within the sprue bushing 56 and within the sleeve valve 68 from the mold cavity 25. Importantly, the sleeve valve 68 is sized to correspond with the desired size of the central aperture in the disc 12, and this movement of the sleeve valve 68 functions to mold a central aperture 86 into the disc 12 prior to solidification of the plastic material within the mold cavity 25.

Figure 6:
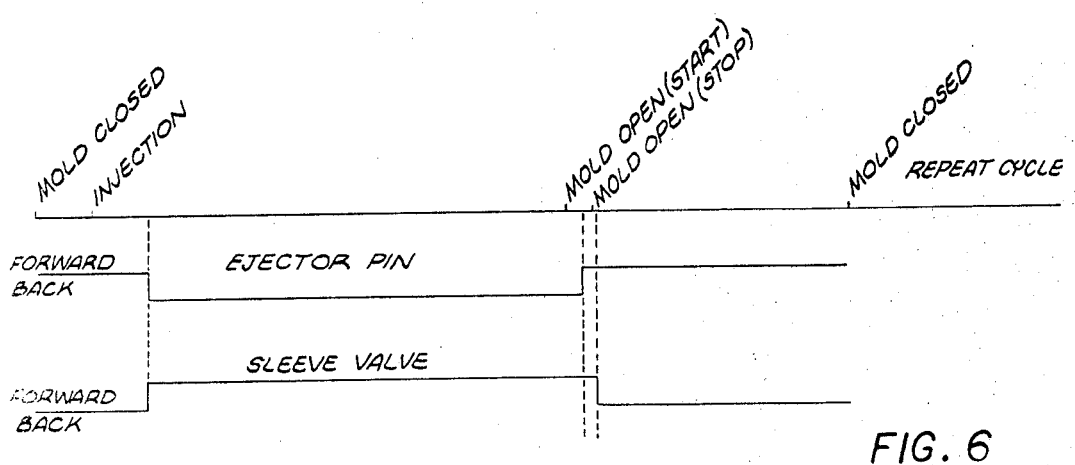
FIG. 6 is a simplified graphical representation illustrating operation of the hot sprue valve assembly of FIGS. 1–5.

Concurrently with "forward" movement of the sleeve valve 68, the ejector pin 80 is moved to the reverse or "back" position as shown in FIG. 3. These simultaneous movements of the sleeve valve 68 and the ejector 80 are illustrated by the graph of FIG. 6. This movement of the ejector pin 80 produces a small cavity 88 at the upper end of the valve guide 76 into which molten plastic material displaced by the sleeve valve 68 is allowed to flow and fill. Conveniently, as illustrated in FIG. 3, this small cavity 88 at the head of the ejector pin 80 is lined by an annular undercut 90 formed in the valve guide 76, the purpose of which will be described in more detail. Moreover, the axial face of the sleeve valve 68 engaging the sprue bushing 56 desirably includes a radially inwardly presented taper, as at 84, to encourage the displaced plastic material to flow radially inwardly toward the cavity 88.

The liquid coolant is supplied to the mold halves 14 and 20 for flow through the circulating paths 66 to reduce the temperature of the molten plastic material within the mold cavity 25 and thereby solidify the record disc 12. This circulation of the liquid coolant also at least partially solidifies the plastic material circumscribed within the sleeve valve 68 to a semi-rigid state.

Of course, according to this invention, the liquid coolant is not supplied to solidify the molten plastic material within the flow path 55 of the sprue bushing 56 whereby a precise separation line between the relatively small wafer 92 and the still-molten plastic material within the flow path 55 is not well defined. Nevertheless, the wafer 92 and the molten plastic material within the sprue bushing flow path 55 are isolated from the disc 12 within the mold cavity 25 to allow the disc to be rapidly solidified. Only partial solidification of the wafer 92 is necessary before the mold cavity 25 can be opened and the molded record disc 12 extracted from the machine.

Figure 5:
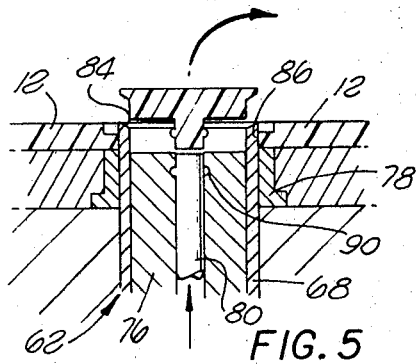
FIG. 5 is an enlarged fragmented cross sectional view illustrating the valve assembly in a further subsequent position of movement.

As illustrated in FIG. 4, once the record disc 12 has solidified, the mold halves 14 and 20 are separated for extraction of the record disc 12 from the machine. Upon initial separation of the mold halves 14 and 20, a small portion of the wafer 92 received within the valve guide undercut 90 prevents uncontrolled ejection of the wafer from the mold assembly. At the appropriate time, the ejector pin 80 is advanced to its "forward" position as illustrated in FIG. 5, to eject the small wafer 92 from the mold assembly 10. When this is achieved, the sleeve valve 68 is retracted to its "back" position and the record disc 12 is extracted in a known manner. The mold halves 14 and 20 can then be closed once again to define the mold cavity 25 and the injection molding cycle is repeated. These various latter movements of the ejector pin 80 and the sleeve valve 68 are also illustrated by the graph of FIG. 6.

The hot sprue valve assembly 62 shown and described in FIGS. 1-5 is highly advantageous compared with valve assemblies and ejectors commonly found in the prior art. For example, the valve assembly 62 isolates the molten plastic material within the sprue bushing 56 from the mold cavity 25 during solidification of the material within the mold cavity. This allows the machine production rate to be governed by the solidification time of the disc 12 within the cavity 25, and not by the longer solidification time of plastic material within the region of the sprue bushing 56. This results in substantial decreases in cycle time for each record disc 12, and corresponding substantial increases in machine production rate.

The hot sprue valve assembly 62 of FIGS. 1-5 is further advantageous in that the cylindrical sleeve valve 68 functions to mold the central aperture 86 into the record 12 prior to material solidification thereby eliminating the need for punching or other post-solidification formation of the central aperture. This molding technique eliminates any need to grind or otherwise machine the size and shape of the central aperture to a final size, and also prevents possible cracking of the disc 12 or the creation of small debris during punching which can become trapped within the mold cavity 25 and deleteriously affect subsequent record disc formation. Still further, the use of the sleeve valve 68 to mold the central aperture eliminates the requirement for periodic replacement of a conventional punching apparatus which can wear over a period of time.

Figure 7:
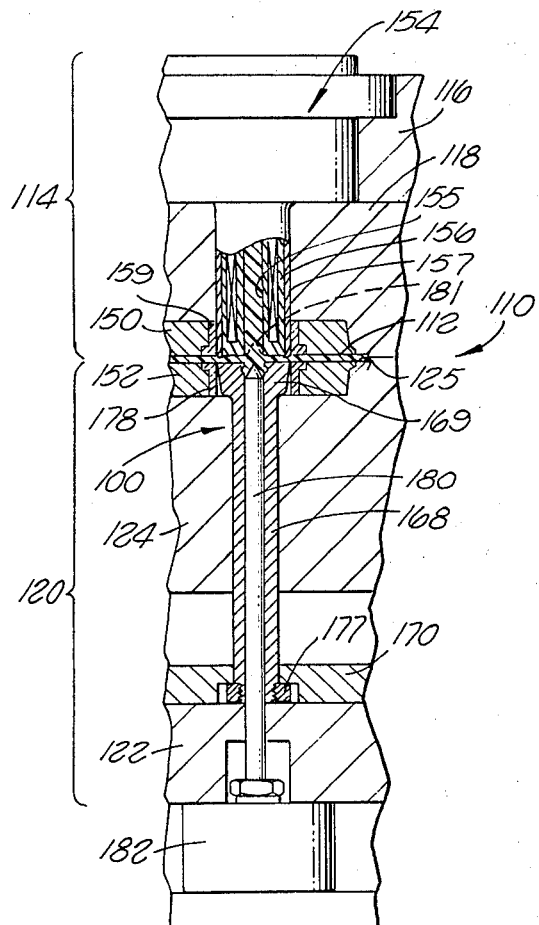
FIG. 7 is an enlarged fragmented cross sectional view illustrating an alternate embodiment of the hot sprue valve assembly of this invention.
Figure 8:
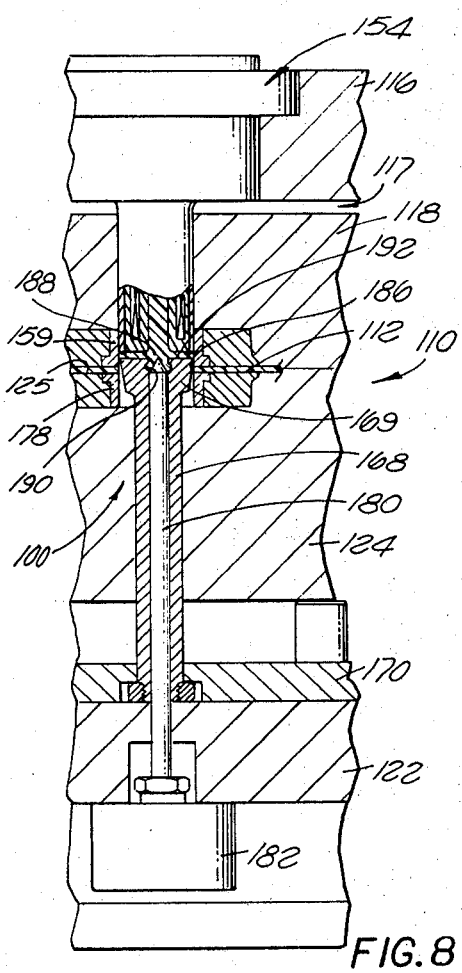
FIG. 8 is an enlarged fragmented cross sectional view similar to FIG. 7 and illustrating a subsequent position of movement of the alternate valve assembly.

An alternate embodiment of the invention is illustrated in FIGS. 7-10, and comprises a hot sprue valve assembly 100 for use with a molding assembly 110 of an injection molding machine generally of the type described above with respect to the embodiment of FIGS. 1-5. More specifically, as shown in FIGS. 7 and 8, the molding apparatus 110 comprises a first mold half 114 with a base plate 116 and a carrier plate 118, and a second mold half 120 with a base plate 122 and a carrier plate 124. The two mold halves 114 and 120 are reciprocally movable toward and away from each other to open and close a relatively thin and substantially planar, disc-shaped mold cavity 125 in which a record disc 112 is molded. The two carrier plates 118 and 124 of the two mold halves 114 and 120 carry platens and stamping dies similar to those described with reference to FIGS. 1-5, whereby these details are not repeated. Once again, a specific discussion of the structural details and cooperation of these components in an injection machine can be had by reference to the above-cited copending application Ser. No. 031,025, filed Apr. 18, 1979.

An injector assembly 154 is carried by the base plate 116 of the first mold half 114 for supplying molten plastic material to the mold cavity 125. As in the previous embodiment, this injection assembly 154 includes a cylindrical sleeve 157 projecting downwardly through the carrier plate 118 in axial alignment with the central axis of the mold cavity 125. The sleeve 157 slides within the carrier plate 118 and with respect to a die bushing 159 secured in position by a central clamp 150.

A hot sprue bushing 156 is concentrically carried within the sleeve 157, and this bushing 156 defines a flow path 155 for molten plastic material from the injector assembly 154 to the mold cavity 125. A heating coil 160 or the like is carried by the sprue bushing 156 to maintain the temperature of the plastic material injected therethrough, and thereby maintain that material in a molten state.

The hot sprue valve assembly 100 of FIG. 7 is provided for closing off the sprue bushing 156 to further flow of plastic material when the mold cavity 125 is filled. This allows the portion of the plastic material within the mold cavity 125 to be solidified, as by application of a cooling liquid or the like, independently of the solidification of the plastic material with the sprue bushing flow path 155. As in the previous embodiment, this results in a substantial decrease in mold cycle time for each record disc 112, and thereby provides a corresponding substantial increase in machine production rate.

The hot sprue valve assembly 100 comprises an ejector valve pin 180 positioned on the side of the mold cavity 125 opposite the sprue bushing 156. This ejector valve pin 180 is secured to an air cylinder 182 for controlled movement between a plurality of positions for controlling flow of molten plastic material through the sprue bushing 56. Specifically, the pin 180 is axially aligned with the flow path 155 of the sprue bushing 156 and is movable in response to the air cylinder 182 toward and away from the sprue bushing 156.

The ejector valve pin 180 is slidably received within a sleeve punch 168. This sleeve punch 168 has one end secured as by a nut 177 to a reciprocal plate 170, the movement of which is controlled by a suitable air cylinder (not shown) or the like corresponding with the air cylinder 72 of FIG. 1. The opposite end of the sleeve punch 168 extends through the associated carrier plate 124 of the second mold half 120 and includes a cylindrical punch head 169 adjacent the sprue bushing 156. This punch head 169 is slidably received within a die bushing 178 which is secured in position by a central clamp 152.

In the embodiment of FIGS. 7-10, the ejector valve pin 180 is advanced toward the sprue bushing 156 when the mold cavity 125 is filled with molten plastic material. Specifically, the ejector valve pin 180 includes a tapered conical valve head 181 sized for engaging the sprue bushing 156 to valve off the flow path 155, as shown by the dotted line position of the ejector valve pin 180 in FIG. 7. The ejector valve pin 180 remains in this dotted line position until the plastic material within the mold cavity 125 is solidified.

As soon as the molten plastic material within the mold cavity 125 is solidified, the mold halves 114 and 120 are separated to open the mold cavity and allow extraction of the molded record disc 112 from the mold assembly 110. Importantly, however, upon initial movement of the mold halves 14 and 20, the base plate 116 and the carrier plate 118 of the first mold half 114 separate from each other, as illustrated by the space 117 in FIG. 8. This movement is effective to begin withdrawal of the sprue bushing 156 from the mold cavity 125 while the carrier plates 118 and 124 of the two mold halves 114 and 120 remain initially in abutting contact with each other. This movement is controlled by means of an appropriate latch-lock mechanism of the type disclosed and described in the above-referenced copending patent application Ser. No. 031,205, filed Apr. 18, 1979.

Concurrently with the separating of the base plate 116 and the carrier plate 118 of the first mold half 114, the sleeve punch 168 is advanced through the mold cavity 125 to punch a central aperture 186 of the desired size in the solidified record disc 112. This movement of the sleeve punch 168 is shown in FIG. 8 wherein a relatively small wafer 192 is displaced from the disc 112 to define the aperture 186. During punching, the disc 112 is tightly supported between the die bushings 159 and 178. Importantly, while the wafer 192 is at least partially solidified by virtue of the solidification of the disc 112, the plastic material within the sprue bushing flow path 155 remains substantially in a molten state. As illustrated, the conical head 181 of the ejector valve pin 180 cooperates with the advanced sleeve punch 168 to define a relatively small cavity 188 in which a portion of the wafer 192 is trapped. This prevents uncontrolled falling of the wafer 192 from the mold assembly 110 when the mold halves 114 and 120 are opened, as will be described. If desired, the sleeve punch 168 can include an annular undercut 190 about the conical pin head 181 to assist in controlling the position of the wafer 192.

Figure 9:
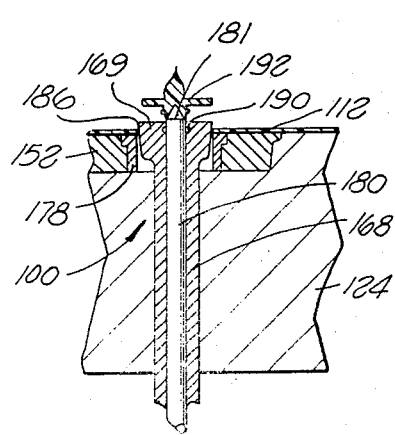
FIG. 9 is an enlarged fragmented cross sectional view illustrating a further subsequent position of movement of the valve assembly of FIG. 7.
Figure 10:
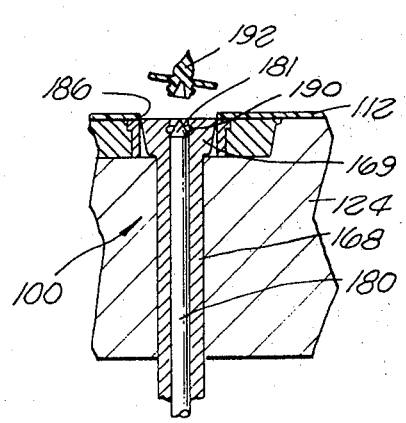
FIG. 10 is an enlarged fragmented cross sectional view similar to FIG. 7 illustrating a return of the valve assembly to its initial position of movement.

Subsequent to punching of the central aperture 186, the two mold halves 114 and 120 are separated to allow for extraction of the molded record disc 112 from the mold assembly 110. As illustrated in FIG. 9, this also allows for removal of the relatively small wafer 192 in the sprue region of the central aperture 186. More specifically, the ejector valve pin 180 is advanced to a further forward position by means of the air cylinder 182 to push to wafer 192 from the end of the advanced sleeve punch 168. As illustrated in FIG. 10, the ejector valve pin 180 and the sleeve punch 168 are then retracted together to their initial positions to allow the wafer 192 to freely fall from the mold assembly 110. At this stage, the molded record disc 112 can be easily removed from the mold assembly 110 in a convenient manner, and the mold halves 114 and 120 can be returned to abutting engagement with each other for the next cycle of the machine.

The hot sprue valve assembly 100 of FIGS. 7-10 operates to isolate the plastic material within the sprue bushing 156 from the mold cavity 125 during solidification of the record disc 112. In this manner, it is not necessary for substantial quantities of plastic material in the sprue region to solidify prior to removal of the disc 112 from the machine. Thus, the disc cycle time is governed by the solidification of plastic material within the mold cavity 125 and not by the solidification of plastic material in the sprue region. This effectively decreases the cycle time for a given record disc 112, and substantially increases the overall machine production rate.

Various modifications and improvements to the hot sprue valve assembly embodiments of this invention are believed to be apparent to one skilled in the art. Accordingly, no limitation upon the invention is intended, except as set forth in the appended claims.

What is claimed is:

1. In an injection molding machine for producing centrally apertured record discs, said machine including a generally disc-shaped mold cavity and a sprue bushing for flow of molten disc-forming material into the mold cavity, a method of controlling flow of the disc-forming material into the mold cavity comprising the steps of:

positioning a sleeve valve in a normal position in spaced relation with the sprue bushing on the side of the mold cavity opposite the sprue bushing for allowing flow of the molten disc-forming material through the sprue bushing into the mold cavity;

positioning an ejector pin concentrically within the sleeve valve in a normal position advanced toward the mold cavity;

moving the sleeve valve through the mold cavity prior to solidification of the disc-forming material therein into bearing engagement with the sprue bushing to prevent further flow of molten disc-forming material through the sprue bushing into the mold cavity and to mold an aperture in the record disc formed in the mold cavity;

substantially simultaneously retracting the ejector pin from the mold cavity to accommodate disc-forming material displaced by the sleeve valve;

returning the ejector pin to its normal position to eject from the machine the portion of the disc-forming material displaced from the aperture; and returning the sleeve valve to its normal position.

2. In an injection molding machine for producing centrally apertured record discs, said machine including a generally disc-shaped mold cavity and a sprue bushing for flow of molten disc-forming material into the mold cavity, a method of controlling flow of the disc-forming material into the mold cavity comprising the steps of:

positioning an ejector valve pin in a normal position in spaced relation with the sprue bushing and on the side of the mold cavity opposite the sprue bushing for allowing flow of molten disc-forming material into the mold cavity;

positioning a sleeve punch concentrically about the ejector valve pin in a normal position on the side of the mold cavity opposite the sprue bushing;

advancing the ejector valve pin through the mold cavity prior to solidification of the disc-forming material therein into bearing engagement with the sprue bushing to prevent further flow of molten disc-forming material through the sprue bushing into the mold cavity;

allowing the disc-forming material within the mold cavity to solidify;

withdrawing the sprue bushing in a direction away from the mold cavity;

advancing the sleeve punch into and through the mold cavity to punch an aperture in the solidified disc;

advancing the ejector valve pin to a further advanced position to dislodge from the punch the portion of the disc-forming material displaced from the aperture; and returning the sleeve punch and the ejector valve pin to their normal positions.

* * * * *